United States Patent [19]

Rangaswamy et al.

[11] Patent Number: 4,725,508
[45] Date of Patent: Feb. 16, 1988

[54] COMPOSITE HARD CHROMIUM COMPOUNDS FOR THERMAL SPRAYING

[75] Inventors: Subramaniam Rangaswamy, Port Jefferson Station; Burton A. Kushner, Old Bethpage, both of N.Y.; Roger Kaufold, Madison, Conn.

[73] Assignee: The Perkin-Elmer Corporation, Norwalk, Conn.

[21] Appl. No.: 922,223

[22] Filed: Oct. 23, 1986

[51] Int. Cl.$^4$ .................... B32B 1/00; B32B 15/02
[52] U.S. Cl. ..................... 428/570; 428/403; 75/251; 75/255
[58] Field of Search ............ 428/403, 570, 937; 427/423; 75/255, 252, 254

[56] References Cited

U.S. PATENT DOCUMENTS

| | | | |
|---|---|---|---|
| 2,868,639 | 1/1959 | Gonser | 75/171 |
| 2,875,043 | 2/1959 | Tour | 75/134 |
| 2,936,229 | 5/1960 | Shepard | 75/0.5 |
| 3,049,435 | 8/1962 | Shwayder | 117/22 |
| 3,254,970 | 6/1966 | Dittrich et al. | 428/570 |
| 3,428,442 | 2/1969 | Yurasko | 428/570 |
| 3,443,754 | 5/1969 | Charlop | 239/85 |
| 3,471,310 | 10/1969 | Joseph | 428/570 |
| 3,846,084 | 11/1974 | Pelton | 428/403 |
| 4,150,905 | 4/1979 | Kaplan et al. | 428/403 |
| 4,227,928 | 10/1980 | Wang | 428/570 |
| 4,309,457 | 1/1982 | Kawasumi et al. | 427/214 |
| 4,309,458 | 1/1982 | Kawasumi et al. | 428/403 |
| 4,606,948 | 8/1986 | Hajmrle et al. | 428/570 |

FOREIGN PATENT DOCUMENTS 0867455 5/1961 United Kingdom .

OTHER PUBLICATIONS

Sherritt Metal Powders, brochure by Sherritt Gordon Mines Limited, Issue No. 3, Jan. 1960, 6 pages-Composite Powders.

*Primary Examiner*—John J. Zimmerman
*Attorney, Agent, or Firm*—H. S. Ingham; F. L. Masselle; E. T. Grimes

[57] ABSTRACT

A thermal spray material has been developed that includes a composite powder comprising chromium carbide or chromium boride and copper or copper alloy in the form of kernels of the chromium carbide or boride clad with the copper or copper alloy. Preferably the thermal spray material includes a self-fluxing alloy composition.

16 Claims, No Drawings

COMPOSITE HARD CHROMIUM COMPOUNDS FOR THERMAL SPRAYING

This invention relates to composite chromium carbide and chromium boride powders suitable for combining with self-fluxing alloy compositions to produce coatings that are characterized by improved fusibility and grindability.

BACKGROUND OF THE INVENTION

Thermal spraying, also known as flame spraying, involves the heat softening of a heat fusible material such as metal or ceramic, and propelling the softened material in particulate form against a surface which is to be coated. The heated particles strike the surface and bond thereto. A conventional thermal spray gun is used for the purpose of both heating and propelling the particles. In one type of thermal spray gun, the heat fusible material is supplied to the gun in powder form. Such powders typically comprise small particles, e.g., between 80 mesh U.S. standard screen size (180 microns) and about 5 microns.

A thermal spray gun normally utilizes a combustion or plasma flame to produce the heat for melting of the powder particles. It is recognized by those of skill in the art, however, that other heating means may be used as well, such as electric arcs, resistance heaters or induction heaters, and these may be used alone or in combination with other forms of heaters. In a powder-type combustion thermal spray gun, the carrier gas, which entrains and transports the powders, can be one of the combustion gases or an inert gas such as nitrogen, or it can be simply compressed air. In a plasma spray gun, the primary plasma gas is generally nitrogen or argon. Hydrogen or helium is usually added to the primary gas. The carrier gas is generally the same as the primary plasma gas, although other gases, such as hydrocarbons, may be used in certain situations. A modified type of plasma gun utilizes a transferred arc between the gun and the substrate.

The material alternatively may be fed into a heating zone in the form of a rod or wire. In the wire type thermal spray gun, the rod or wire of the material to be sprayed is fed into the heating zone formed by a flame of some type, such as a combustion flame, where it is melted or at least heat-softened and atomized, usually by blast gas, and thence propelled in finely divided form onto the surface to be coated. In an arc wire gun two wires are melted in an electric arc struck between the wire ends, and the molten metal is atomized by compressed gas, usually air, and sprayed to a workpiece to be coated. The rod or wire may be conventionally formed as by drawing, or may be formed by sintering together a powder, or by bonding together the powder by means of an organic binder or other suitable binder which disintegrates in the heat of the heating zone, thereby releasing the powder to be sprayed in finely divided form.

Self-fluxing alloys of nickel and cobalt are quite common for hard facing coatings. They contain boron and silicon which act as fluxing agents during the coating operation and as hardening agents in the coating. A common method of processing such alloys is by thermal spraying.

Usually self-fluxing alloys are applied in two steps, namely thermal sprayed in the normal manner and then fused in situ with an oxyacetylene torch, induction coil, furnace or the like. The fluxing agents make the fusing step practical in open air. However, the alloys may also be thermal sprayed with a process such as plasma spraying without requiring the fusing step, but the coatings are not quite as dense or wear resistant. Generally self-fluxing alloy coatings are used for hard surfacing to provide wear resistance, particularly where a good surface finish is required since the fusing produces a coating having very low porosity.

A typical self-fluxing alloy composition of nickel or cobalt contains chromium, boron, silicon and carbon. An alloy may additionally contain molybdenum, tungsten, copper and/or iron. For example U.S. Pat. No. 2,875,043 discloses a spray weld alloy composed of (by weight) up to 20% chromium, 1 to 6% boron, up to 6% silicon, up to 10% iron, 3 to 10% molybdenum, 3 to 8% copper, up to 1.5% carbon, the remainder at least 40% nickel. Similarly, U.S. Pat. No. 2,936,229 discloses a cobalt alloy containing 1.5 to 4% boron, 0 to 4% silicon, 0 to 3% carbon, 0 to 20% tungsten and 0 to 8% molybdenum.

If very high wear resistance is needed a carbide such as tungsten carbide is added as described, for example, in British Pat. No. 867,455. These carbide-containing alloys are generally difficult to grind finish and are harder to fuse than the self-fluxing alloys without carbide.

As illustrated in the above-mentioned British patent, a tungsten carbide typically is combined with a cobalt or nickel binder in an amount, for example, of about 12 percent by weight. The cobalt or nickel may be combined with the carbide by sintering or alloying. Alternatively the metal may be clad onto the carbide as taught in U.S. Pat. Nos. 3,049,435 and 3,254,970. The first of these patents discloses nickel clad tungsten carbide blended with self-fluxing alloy powder.

The above-mentioned U.S. Pat. No. 3,254,970 discloses various composite flame (i.e., thermal) spray powders formed by cladding including nickel clad cobalt-tungsten carbide and nickel clad nickel-titanium carbide (Examples 10 and 14). The patent also discloses the cladding of various metals with copper (e.g., Examples 25 and 26). A process for copper cladding powders of a number of metals and oxides as well as tungsten carbide and titanium carbide is taught in U.S. Patent No. 4,309,457.

Chromium carbide ($Cr_3C_2$) powder is known for use in the thermal spray process, as is chromium boride. One form, nickel clad chromium carbide, has been thermal sprayed, for example, in a blend with a self-fluxing alloy powder and a nickel-aluminum composite powder as a product sold by Metco Division of The Perkin-Elmer Corporation, Westbury, N.Y., as "Metco 430NS".

In view of the foregoing, a primary object of the present invention is to provide a novel form of chromium carbide and chromium boride thermal spray powder.

A further object of this invention is to provide an improved self-fluxing alloy-containing composition with a novel form of chromium carbide or chromium boride, for producing thermal spray coatings characterized by ease of fusing and grind finishing. Another object is to provide a thermal spray process for producing wear resistant coatings characterized by ease of fusing and grind finishing.

BRIEF DESCRIPTION OF THE INVENTION

The foregoing and other objects are achieved by a thermal spray material that includes a composite powder comprising a hard chromium compound and copper or copper alloy in the form of kernels of the hard chromium compound clad with the copper or copper alloy. The hard chromium compound may be chromium carbide or chromium boride. Preferably the thermal spray material includes a self-fluxing alloy composition.

DETAILED DESCRIPTION OF THE INVENTION

According to the present invention a hard chromium compound powder clad with copper or copper alloy is particularly useful for thermal spraying. The compound may be a carbide or a boride. The composite copper clad powder may be thermal sprayed as-is but is particularly suitable for combining with a further material such as a self-fluxing alloy composition. The further material may be in the form of a powder, thus forming a blend with the copper-clad chromium carbide or boride. An alternative is to configure the material as a wire using the clad chromium carbide or boride powder as a core constituent in a metallic sheath. Preferably, substantially pure copper is used for the cladding, vis., copper containing no more than about 5 atomic percent impurities. As used herein and in the claims, "copper alloy" means any alloy containing a major portion of copper and having a melting point not greater than about 1100° C. Examples are the ordinary brass and bronze alloys containing zinc, tin or phosphorous. Preferably the hard chromium compound is chromium carbide.

The chromium compound should be clad with about one percent to about 20 percent, preferably about 5 percent to about 15 percent, by weight copper or copper alloy using any known or desired cladding or coating method. In one construction, the copper or copper alloy is plated chemically onto kernels of the chromium compound, for example, by the cementation reaction method taught in aforementioned U.S. Pat. No. 4,309,457, or by an electrolytic process or the like.

In a preferred embodiment fine particles of the copper, preferably −20 microns, for example as average 8 micron size powder or as copper flake, are secured to the core particles (kernels) of chromium compound with a binder, such as an organic binder. A thermal spray powder of the present invention should binder. A thermal spray powder of the present invention should have a size generally in the range between about −80 mesh (U.S. Sieve Series, ASTM E-11) to +5 microns, preferably about −120 to +325 mesh or alternatively −325 mesh to +15 microns. Generally the starting core size is equal to, or about one or two screen sizes smaller than the desired size of the final powder, for example, −120 or −140 or −170 mesh size core where the final powder is to be −120 +325 mesh.

The binder material may be any known or conventional binding material which may be used for forming a coating or binding particles together or to a surface. The binder is preferably organic and may be a varnish containing a resin as the varnish solids, or may contain a resin which does not depend on solvent evaporation in order to form a cured or set film. The binder thus may contain a catalyzed resin as the varnish solids. Examples of binders which may be used include the conventional phenolic epoxy or alkyd varnishes, varnishes containing drying oils, such as tung oil and linseed oil, rubber and latex binders and the like. The binder may alternatively be of the water-soluble type, as for example, of the polyvinylpyrrolidone or polyvinylalcohol type. In addition to organic binders, inorganic binders may be used, such as sodium silicate, boric acid, borax, magnesium or other soluble carbonates, nitrates, oxalates or oxychlorides, or colloidal suspensions containing oxides.

The coating of the core material with the binder containing the particles may be effected in any known or desired manner. It is simply necessary to mix the powdered ingredients together while allowing the binder to set and dry, which will result in a fairly free-flowing powder consisting of the core coated with the cladding of the copper.

In another embodiment of the present invention a thin layer or flash coating of nickel is applied to the chromium carbide or boride prior to cladding with the copper. The nickel may be coated by conventional methods such as electrolytic plating or the process of hydrogen reduction as taught in aforementioned U.S. Pat. No. 3,254,970. Alternatively the nickel may be clad as a fine powder in a manner similar to that described above for copper; preferably nickel flake is used to achieve a very thin cladding. The nickel may be present up to about 4 percent of the copper/nickel clad powder, preferably at least 1 percent.

An even higher quality coating will result from the use of the intermediate layer of nickel between the copper and the chromium compound kernels. It is believed that this result is due to better wetting of the kernels by the nickel during thermal spraying. Copper being soluble with nickel, there apparently is improved wetting and bonding of the copper with the kernels.

The copper clad hard chromium compound according to the present invention may be thermal sprayed in the conventional or desired manner. Excellent, well bonded coatings are obtained. However, the copper clad chromium compound preferably is combined with a metallic thermal spray material such as a blend with an 80:20 nickel-chromium alloy powder and/or a 95:5 nickel-aluminum powder.

The copper clad powder is especially suitable for combination with self-fluxing alloy. Thus in a highly desirable embodiment of the present invention the clad kernels are blended with a known or desired self-fluxing alloy such as is disclosed in U.S. Pat. Nos. 2,868,639 and aforementioned 2,936,229. The self-fluxing alloy powder is generally in the same broad size range as the copper clad chromium compound although, for example, it may be desirable for the alloy powder to be somewhat finer than the clad carbide. The powder composite in the blend should be present in an amount between about 5 percent and about 80 percent, preferably about 20 percent and about 60 percent, by weight based on the total of the copper clad chromium compound and the self-fluxing alloy.

As an example, the self-fluxing alloy composition consists essentially of up to 25 percent chromium, 1 to 5 percent boron, up to 6 percent silicon, 0.05 to 3 percent carbon, up to 6 percent iron, up to 6 percent copper, up to 20 percent molybdenum, and up to 20 percent tungsten, balance a metal selected from the group consisting of nickel, cobalt and combinations thereof, the metal being present in an amount of at least 30 percent, the percentages being by weight of the self-fluxing alloy composition.

The powders are sprayed in the conventional manner, using a powder-type thermal spray gun, though it is also possible to combine the same into the form of a composite wire or rod, using plastic or a similar binding, as for example, polyethylene or polyurethane, which decomposes in the heating zone of the gun.

The composite alternatively may be in the form of a wire having a coating sheath of one material and a core of the other, alternate coating sheaths of two components and a core of a third or a fourth material, a wire consisting of a sheath of one component and a core containing the other components in powder or compacted form, a wire formed by bending a metal strip around powder fill, a wire consisting of a plastic sheath and a core containing a compacted powder mixture of components, or other convenient form. The composite wires should have conventional sizes and accuracy tolerances for flame spray wires and thus, for example, may vary in size between 6.4 mm and 20 gauge.

A desirable composite wire for arc spraying with a two-wire arc gun is made in a known manner by forming metal strip into a U-shaped cross section. Core powder is filled into the trough of the "U" and the shape is closed over the powder to a butt or overlap joint. The resulting wire is drawn to desired size. The sheath may be formed of the base constituent, preferably in soft form, for example unalloyed nickel, iron, cobalt or combinations of these metals for ease of fabrications. Thus core is formed of powder and contains the copper clad hard chromium compound powder. As necessary the composite wire core further contains the additional ingredients to provide a self-fluxing alloy composition. For example, the sheath may be nickel and the core may contain, in addition to the copper clad powder, additional chromium, iron, boron, silicon and carbon. These ingredients should be in powder form and may present individually or as alloys of each other, for example, ferrochrome powder and/or boron carbide powder. Powder size for the core powders is generally similar in size to normal thermal spray powers, except boron carbide, if used, should be generally finer than $-20$ microns to allow for full alloying.

The benefits of the present invention are particularly apparent when the self-fluxing alloy powder blend is subsequently fused in the known or desired manner with an oxy-acetylene torch or furnace or the like. Quite surprisingly, the fusing of coatings containing copper clad chromium carbide is accomplished substantially more easily than for the ordinary thermal sprayed self-fluxing alloy coating containing cobalt bonded tungsten carbide, or than for a self-fluxing alloy containing chromium carbide with nickel cladding. The easier fusing is manifested by way of more apparent melting i.e., "shine" during the fusing process, thus allowing the proper temperature (typically about 1100 degrees centigrade) to be quickly reached and maintained during the fusing process.

The ease of fluidity is also manifested by the relatively short time during which the coating uniformly attains a fluid state, indicating fusion and fluxing action. Generally, the addition of several carbides or hard phases inhibit the fusibility of self-fluxing alloys. Fusion of self-fluxing alloys becomes extremely difficult if they contain more than about 40 percent by weight of tungsten carbide-cobalt powders or 45 percent of nickel-clad chromium carbide. Surprisingly, fusion of self-fluxing alloys is easily accomplished if copper-clad chrome carbide is present up to 60 percent.

In addition to the ease of fusing, the copper cladding on chrome carbide according to this invention also minimizes decomposition of chromium carbide during spraying, thereby enabling a significantly higher recovery of the chromium carbide in a sprayed deposit. This is a major advantage compared to self-fluxing alloy blends containing unclad chromium carbide. In blends where unclad chromium carbide is sued, the carbide component undergoes excessive decomposition during spraying and results in a low recovery of the carbide in the sprayed deposit. When fused, these coatings do not possess adequate wear resistance.

A further benefit of substantial importance is the ability to deposit thick coatings. Self-fluxing alloys containing copper-clad chromium carbide (50 percent) show no signs of lifting when sprayed up to 2.5 mm thickness, whereas self-fluxing alloys blended with 50 percent of cobalt-bonded tungsten carbide tend to lift and spall beyond 0.5 mm thickness.

A further benefit of substantial importance is the ease of grinding the coating for finishing, particularly when the coating is fused. Silicon carbide grinding wheels may be used at high grinding speeds without excessive wear of the wheel. In comparison fused self-fluxing alloys with cobalt bonded tungsten carbide, produced from similar size powder and comparable weight proportion of carbide, grind at about one-half or even lesser rate and the grinding wheel deteriorates rapidly. For this reason diamond grinding wheels are normally used for such coatings containing tungsten carbide, and diamond grinding is also relatively slow. A surprising aspect of these grinding comparisons is that abrasive wear resistance of fused self-fluxing alloy containing copper clad chromium carbide according to the present invention is approximately equivalent to or even better than similar coatings with tungsten carbide (again with comparable proportions).

Hence copper clad chromium carbide according to the present invention may be substituted directly for conventional cobalt bonded tungsten carbide in fusible alloy coatings, to obtain similar or better wear resistance but with substantial improvements in the processing steps of fusing and grinding. These improvements will be reflected in important cost savings.

In addition to excellent abrasive wear resistance and ability for very fine grind finish, coatings produced according to the present invention are expected to provide improved friction and frictional wear resistance, and less wear of mating parts, over tungsten carbide type coatings.

Typical applications are components for petroleum production such as pump plungers, sucker rod couplings, sleeves, mud pump liners and compressor rods; glass manufacture such as molds, mold plates, plungers and neck rings; electric utility and power generation boilers such as pump components (shafts, seals, liners), water walls and control valves; chemical process such as pump components, gate valves, compressor rods and plungers; and others such as machine maintenance and salvage, printing rolls, plating fixtures and machine ways.

The following examples are given by way of illustration and not limitation.

EXAMPLE 1

A chromium carbide ($Cr_3C_2$) powder having a particle size between $-140$ mesh and $+30$ microns is coated with a flash of nickel in the known manner by the hydrogen reduction of an ammoniacal solution of nickel and ammonium sulphate, as described in aforementioned U.S. Pat. No. 3,254,970, Example 1. This nickel clad carbide is then coated with copper in a similar manner from ammoniacal solution of copper using the process of Sherritt Gordon Mines Ltd., Saskatchewan, Canada. The nickel is present in an amount of 1.8 percent and the copper is present in an amount of 11.8 percent by weight of the coated powder. This powder is screened to a size between −120 mesh and +325 mesh.

The copper/nickel coated chromium carbide powder is blended with a self-fluxing alloy powder having ASM Specification 4775A and a size between −270 mesh and +15 microns. The blend contained 35 percent by weight of copper/nickel coated chromium carbide. This is thermal sprayed onto mild steel substrates that are prepared in the normal manner by grit blasting, with a combustion powder spray gun of the type disclosed in U.S. Pat. No. 3,443,754 and sold by the Metco Division of The Perkin-Elmer Corporation as the Type 5P Gun, using a "G" nozzle, #11 meter valve, oxygen at 25 psi and 34 scfh flow, acetylene at 13 psi and 34 scfh flow, "pinch" air at 30 psi, 5.5 inches spray distance and spray rate of 16 pounds per hour. The resulting coating is fused with an oxyacetylene torch at about 1100 degrees Centigrade. The coatings are ground with an 80 grit silicon carbide wheel at 360 rpm and an infeed rate of 8.75 microns per cycle.

EXAMPLE 2

Example 1 is repeated except a blend of self-fluxing alloy and 50 percent by weight copper/nickel clad chromium carbide is prepared.

EXAMPLE 3

A chromium carbide powder of the type used in Example 1 is clad as follows. A polyvinylpyrrolidone (PVP) binder solution containing 250 gms of solids in 750 cc of water is prepared. Approximately 400 cc of this solution is added to 4000 gms of the chromium carbide core powder and mixed well. To this, about 600 gms of −400 mesh copper powder of average size 8 microns is slowly added and mixed thoroughly with additional water and the mixing continued until the binder dried, leaving a fairly freeflowing powder in which all of the carbide core particles are clad with a dry film which contained the copper particles. The powder is warmed to about 120 degrees Centigrade to ensure complete drying. The powder so formed comprises particles of chromium carbide core with fine copper particles secured to the core with the binder. The copper content is 13 percent of the total of the carbide and copper.

The copper clad powder is blended with the same type of self-fluxing alloy as in Example 1, the chromium carbide content being 35 percent. The blend is similarly thermal sprayed, fused and ground.

EXAMPLE 4

For comparison with a powder not according to the present invention, chromium carbide is coated with nickel flake using a binder with the method described in Example 3. The nickel is present in an amount of 8 percent by weight of the total of the carbide and nickel. The coated powder is blended with the same type of self-fluxing alloy, and is sprayed, fused, and ground as for Example 1.

EXAMPLES 5

Several powders outside the present invention are thermal sprayed, as follows:

(a) A blend of 35 percent chromium carbide, without cladding, and self-fluxing alloy; both powders being of the type and size used in Example 1.

(b) A blend of 35 percent tungsten carbide (including 12 percent cobalt) and 65 percent self-fluxing alloy, sold by Metco under the designation Metco 31C; the self-fluxing alloy being of the type used in Example 1 but coarser such that the blend has a size between −120 mesh and +325 mesh.

(c) A blend of 50 percent tungsten carbide (including 12 percent cobalt) and 50 percent self-fluxing alloy, sold by Metco under the designation Metco 34FP; the self-fluxing alloy being of the type and size used in Example 1. The blend has a size between −270 mesh and +15 microns.

EXAMPLE 6

A series of blends are produced in the same manner as for Example 1 except percentage of coated carbide is varied in 5 percent increments from 35 to 70 percent by weight of the copper/nickel coated chromium carbide. For comparison similar blends, not according to the present invention, are prepared using varying amounts of nickel-clad chromium carbide from Example 4 and tungsten carbide as in Example 5(b) and 5(c), and are thermal sprayed, fused and ground in the same manner. Thermal spraying, fusing and grinding are effected as in Example 1.

EXAMPLE 7

The copper clad powders of Examples 1, 2 and 3 are thermal sprayed as-is, without blending, using similar gun parameters. Excellent coatings are obtained thereby.

EXAMPLE 8

Composite wires are fabricated by taking a continuous strip of nickel and forming it into a U-shape. Core powder is blended of 79 percent by weight of the copper/nickel clad chromium carbide of Example 1, 16 percent of −80 +325 mesh chromium, 2 percent −20 micron silicon and 3 percent −20 micron boron carbide. The powder is filled into the trough of the strip. This filled U-shape is then closed to an overlap joint and the wire is drawn to 11 gauge size (2.3 mm; i.e. 0.091 inches). The nickel strip is 12.4 mm (0.489 inches) wide and 0.28 mm (0.011 inches) thick. The nickel sheath forms 43 percent by weight of the final wire, which has the composition 43 percent nickel, 9 percent chromium 1 percent silicon, 2 percent boron carbide and 45 percent copper/nickel clad chromium carbide. Two such wires are fed simultaneously through an arc gun sold by Metco under the trademark METCO Type 2RG. Parameters are 200 amperes, 28 volts, atomizing air 2.7 bar (40 psi), spray distance 18 cm (7 inches) and spray rate 6.4 kg/hr (14 lbs/hr.) excellent, well bonded coatings are obtained.

EXAMPLE 9

Example 1 is repeated except using chromium boride in place of chromium carbide. Similar results are effected. The self-fluxing alloy blends containing chromium carbide according to certain of the above examples, and commercial blends containing tungsten carbide of the known type, were compared in various ways.

Abrasive wear resistance was measured by placing coated samples in sliding motion against a cast iron plate with a slurry of 150 gms of between 270 mesh (53 microns) and 15 microns aluminum oxide abrasive powder in 500 ml of water. A load of 3.3 kg/cm² was applied and the surface motion was about 122 cm/sec for 20 minutes. Coating thickness loss was determined for the test coatings and compared with thickness loss for a standard coating. In the present case the standards were the tungsten carbide coating of Example 5(B) and 5(C). Results for Examples 1, 2 and 5 are presented in Table I.

TABLE 1

| COATING | Wear Resistance | |
|---|---|---|
| | HARDNESS (Rc) | WEAR LOSS (microns) |
| Example 1 | 50–55 | 56.0 |
| Example 2 | 55–60 | 47.0 |
| Example 5(a) | 50–55 | 78.0 |
| Example 5(b) | 52–60 | 75.0 |
| Example 5(c) | 55–62 | 50.0 |

In general, the abrasive slurry wear resistance of the chromium carbide blends were comparable to or better than the tungsten carbide blends, if equivalent weight percentage of carbides are used. Specifically the blend containing 35 percent copper/nickel clad chromium carbide was comparable to the tungsten carbide blend of Example 5(b), and the blend containing 50 percent copper/nickel clad chromium carbide is comparable to the tungsten carbide blend of Example 5(c), in abrasive wear.

The wear resistance of a 35 percent copper/nickel clad chromium carbide blend was 1.34 times better than Example 5(b) and 1.39 times better than 35 percent unclad chromium carbide blend. The results indicate that the recovery and distribution of blended chromium carbide particles in a fused self-fluxing alloy coating is uniquely enhanced by cladding the carbide particles with copper. The relative ease of fusibility was estimated subjectively using a combination of factors such as shiny appearance and fluidity. Results are in Table II.

TABLE II

| Fusibility of Carbide Blends | |
|---|---|
| Blended Carbide (weight percent) | Fusibility |
| A. Cu/Ni clad Cr₃C₂ | |
| 35% | Excellent |
| 50% | Excellent |
| 60% | Very Good |
| B. Ni clad Cr₃C₂ | |
| 35% | Excellent |
| 50% | Fair |
| 60% | Poor |
| C. Cobalt/Tungsten Carbide | |
| 35% | Good |
| 50% | Poor |

At equivalent weight percent of carbides in the blend, copper-clad chromium carbide compositions fuse much more readily compared to the cobalt-tungsten carbide containing blends. Also, the copper clad blend of chromium carbide fused more readily compared to the blend of nickel-clad chromium carbide.

Table II includes results for Example 6, and indicates improved fusibility for the copper cladding over nickel cladding, for the intermediate proportions of chromium carbide with self-fluxing alloy. Table II also indicates improved fusibility of copper/nickel clad chromium carbide over blends containing tungsten carbide.

Fused coatings from copper clad chromium carbide blends are easily finished to less than 0.25 microns aa (arithmetic average) by silicon carbide grinding and in half the time as compared to the equivalent tungsten carbide coatings. Also, the tungsten carbide coatings caused more damage to the silicon carbide grinding wheel causing more silicon carbide wear debris during grinding. Table III shows grindability of various coatings.

TABLE III

| | SiC Grindability of Fused Coatings | |
|---|---|---|
| COATING | STOCK REMOVAL RATE (cm³/hr) | SURFACE FINISH (microns aa) |
| Example 1 | 23.3 | 0.10–0.15 |
| Example 2 | 22.0 | 0.23–0.46 |
| Example 5(b) | 11.9 | 0.18–0.30 |
| Example 5(c) | 6.8 | 0.28–0.64 |

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A thermal spray material including a composite powder comprising a hard chromium compound and a copper metal in the form of kernels of the hard chromium compound clad with the copper metal, the hard chromium compound being selected from the group consisting of chromium carbide and chromium boride, and the copper metal being selected from the group consisting of copper and copper alloys.

2. A thermal spray material according to claim 1 wherein the composite powder has a size between −80 mesh and +5 microns.

3. A thermal spray material according to claim 1 wherein the copper metal is present in an amount of about 1 to about 20 percent by weight.

4. A thermal spray material according to claim 1 including a layer of nickel superimposed between the kernels and the copper metal.

5. A thermal spray material according to claim 4 wherein the nickel is present in an amount up to about 4 percent by weight.

6. A thermal spray material according to claim 1 wherein the copper metal is in the form of fine particles clad to the kernels with a binder.

7. A thermal spray material according to claim 6 wherein the binder is an organic binder.

8. A thermal spray material according to claim 1 further including a self-fluxing alloy composition.

9. A thermal spray material according to claim 8 wherein the composite powder comprises about 5 to 80 percent by weight of the total of the composite powder and the self-fluxing alloy composition.

10. A thermal spray material according to claim 8 wherein the self-fluxing alloy composition is in the form of a powder blended with the composite powder.

11. A thermal spray material according to claim 8 wherein the self-fluxing alloy composition consists essentially of up to 25 percent chromium, 1 to 5 percent boron, up to 6 percent silicon, 0.05 to 3 percent carbon, up to 6 percent iron, up to 6 percent copper, up to 20 percent molybdenum, and up to 20 percent tungsten, balance a metal selected from the group consisting of nickel, cobalt and combinations thereof, the metal being present in an amount of at least 30 percent, the percentages being by weight of the self-fluxing alloy composition.

12. A thermal spray material according to claim 8 in the form of a composite wire having an alloy sheath and a core, the alloy sheath consisting essentially of a sheath metal selected from the group consisting of nickel, cobalt and combinations thereof, and the core comprising the composite powder.

13. A thermal spray material according to claim 1 wherein the hard chromium compound comprises chromium carbide.

14. A thermal spray material according to claim 8 wherein the hard chromium compound comprises chromium carbide.

15. A thermal spray material according to claim 1 wherein the coppe metal is substantially pure copper.

16. A thermal spray powder blend of size substantially between 80 mesh and +15 microns, comprising:
a composite powder comprising chromium carbide, about 1 to about 20 percent copper and about 1 to about 4 percent nickel in the form of kernels of the chromium carbide clad sequentially with the nickel and the copper, the percentages of nickel and copper being by weight of the composite powder; and
a self-fluxing alloy powder consisting essentially of elements in the amount of up to 25 percent chromium, 1 to 5 percent boron, up to 6 percent silicon, 0.05 to 3 percent carbon, up to 6 percent iron, up to 6 percent copper, up to 20 percent molybdenum, up to 20 percent tungsten and balance a metal selected from the group consisting of nickel, cobalt and combinations thereof, the metal being present in an amount of at least 30 percent, the percentages of elements being by weight of the self-fluxing alloy;
the composite powder being present in an amount between about 5 and about 80 percent by weight of the total of the composite powder and the self-fluxing alloy powder.

* * * * *